United States Patent [19]

Katscher et al.

[11] 4,300,984
[45] Nov. 17, 1981

[54] TOP REFLECTOR FOR A NUCLEAR-REACTOR VESSEL

[75] Inventors: Werner Katscher, Jülich; Klaus Kasper, Ratingen, both of Fed. Rep. of Germany

[73] Assignee: Kernforschungsanlage Jülich GmbH, Jülich, Fed. Rep. of Germany

[21] Appl. No.: 960,757

[22] Filed: Nov. 14, 1978

[30] Foreign Application Priority Data

Nov. 15, 1977 [DE] Fed. Rep. of Germany ....... 2751065

[51] Int. Cl.³ .............................................. G21C 5/00
[52] U.S. Cl. ................................................... 376/459
[58] Field of Search ....................... 176/84, 85, 58 PB

[56] References Cited

U.S. PATENT DOCUMENTS

| | | | |
|---|---|---|---|
| 2,872,398 | 2/1959 | Ashley et al. | 176/84 |
| 3,022,239 | 2/1962 | Rodwell | 176/84 |
| 3,076,753 | 2/1963 | Bell | 176/84 X |
| 3,085,963 | 4/1963 | Martin | 176/84 |
| 3,093,568 | 6/1963 | Cox | 176/84 |
| 3,152,965 | 10/1964 | Lemesle et al. | 176/84 |
| 3,172,820 | 3/1965 | Lenngren et al. | 176/84 X |
| 3,329,576 | 7/1967 | Rouge et al. | 176/84 |
| 3,351,535 | 11/1967 | Warner | 176/84 |
| 3,660,232 | 5/1972 | Banks | 176/84 |
| 4,110,158 | 8/1978 | Maly et al. | 176/58 PB |

FOREIGN PATENT DOCUMENTS

2631408 1/1978 Fed. Rep. of Germany ... 176/58 PB

*Primary Examiner*—Peter A. Nelson
*Attorney, Agent, or Firm*—Karl F. Ross

[57] ABSTRACT

A top reflector for a nuclear-reactor vessel, i.e. the containment for a nuclear-reactor core, especially of a high-temperature or pebble bed reactor, is composed of laterally contiguous bodies (e.g. of graphite) which can be suspended from a support and in which means is provided for the form-fitting interengagement of the adjacent bodies to prevent collapse of the top reflector upon failure of the suspension.

9 Claims, 16 Drawing Figures

TOP REFLECTOR FOR A NUCLEAR-REACTOR VESSEL

FIELD OF THE INVENTION

The present invention relates to a nuclear-reactor vessel and, more particularly, to a top reflector for a vessel, housing or containment adapted to enclose a nuclear-reactor core, especially for a high-pressure, high temperature or pebble-bed nuclear reactor.

BACKGROUND OF THE INVENTION

High-temperature pebble-bed nuclear-reactor cores are generally received in a reflective housing or vessel which may be composed of cast material, such as graphite, provided with a top reflector which can be suspended from a support structure above the reactor core. The top reflector may also be composed of cast material, i.e. graphite and, in the event the cooling of the reactor core should fail for a prolonged period, it is possible for the suspension to give way, thereby allowing the top reflector to collapse.

It has been proposed to avoid this problem by forming the top reflector as a dome. However, this has been found to be disadvantageous because of its effect upon the operation and installation of other elements of the nuclear reactor, e.g. absorber rods which are frequently inserted through the cover or otherwise must be mounted in relation thereto. In addition, a domed configuration increases the cost and places structural units of the dome under stress, thereby increasing the forces which the cover structure must withstand.

OBJECTS OF THE INVENTION

It is an important object of the present invention to provide an improved top reflector for a nuclear-reactor vessel whereby disadvantages of the earlier systems discussed above are obviated.

It is also an object of the invention to provide a top reflector which can be manufactured simply and at minimum cost, which leaves the components of the top-reflector structure free from significant stress during normal reactor operation, which allows the elements of the top reflector to meet at joints which are relatively tight or sealed, and which has little tendency to collapse even in the event of a failure of a suspension for the elements of the top reflector.

It is also an object of this invention to provide a top reflector for the purposes described which has greater long term effectiveness, ease of assembly and maintainability than earlier systems proposed for this purpose.

SUMMARY OF THE INVENTION

These objects and other which will become apparent hereinafter are attained, in accordance with the present invention by providing, in combination with a nuclear-reactor vessel containing a reactor core (e.g. for a pebble-bed reactor), a suspension from which the top reflector is supported and the remaining elements which are usually present in a forced-cooling, high-temperature nuclear reactor, a top reflector which is assembled from laterally contiguous or adjacent graphite elements provided with mutually engaging complementary formations along their lateral joints and interconnected by such formations in a form-fitting relationship.

Reference will be made to the formations in greater detail below but it is important to point out at the inception of this discussion, that practically all of the complementary laterally engaging joint-forming formations can be described as a denticulate, toothed, notched structure providing a labyrinth joint having effective sealing capabilities.

The cast elements of the top reflector can be suspended in the usual manner from the support structure, e.g. by suspenders or suspension anchors. Should the support structure or parts thereof, e.g. the suspenders, melt away or otherwise fail because of excess heating, the toothed structure between the elements of the top reflector is sufficient to take up the shear stresses and prevent the top reflector from collapsing inwardly although the cover may sag somewhat.

According to a feature of the invention, the elements of the top reflector, which may be referred to hereinafter as blocks, are of prismatic configuration and preferably can be flat with regular polygonal configuration, i.e. having three, four, six, or more lateral sides, each of which adjoins a neighboring block and is connected thereto by a toothed structure. The toothed structure may be formed in part by or may be provided in addition to locking elements such as plugs, keys and the like affording the form-fitting connection between adjacent blocks.

For example, when the blocks are generally rectangular, the corners of each block can be provided with a recess conforming to a cylindrical segment such that the recesses of two or more blocks at each corner define a cylindrical passage, the segments of all of the corners having the same radius of curvature. Connecting members and closure members, e.g. plugs, can be fitted into these cylindrical passages to interconnect the adjacent members at their corners.

The wall of the recess can have generally inclined and parallel grooves which can be milled into the cast bodies and which are aligned with the grooves of adjacent bodies so that, upon lateral assembly of the cover reflector, the grooves define screw threads of an internally threaded passage into which the plug can be screwed. Naturally, the plug must have a complementary male thread for this purpose. The plug and the assembled bodies can also be provided with a bayonet connection for quick closure of the passage and rapid securing of the bodies together.

According to another feature of the invention, which is wholly compatible with that previously described (i.e. the use of plugs and recesses defining cylindrical passages to receive the plugs), the bodies can be provided with mutually registering grooves milled into the adjoining lateral sides of adjacent bodies, the grooves receiving shear keys or splines which can be inserted through openings in the recesses communicating with these grooves. Thus the ends of the grooves, when the splines have been fully inserted, can be sealed by the plugs. Naturally, the splines can be used without the plugs.

In addition to the formations described above or as an alternative thereto, we may form the adjoining lateral faces of the block with complementary toothed profiles for form-fitting engagement.

It is preferable that the blocks be of rectangular or hexagonal plan outline.

When the blocks are hexagonal regular prisms, they can be provided, between the upper and lower ends of the blocks, with a disk-shaped portion or flange which is also of hexagonal configuration but which is offset from the hexagonal outline of the ends of the block in the direction of a diagonal thereof. This provides a projecting formation along three sides of the block and a recess along the diagonally opposite three sides thereof for receiving the corresponding projection of an adjacent block.

The disks may be formed unitarily with the remainder of the blocks, i.e. the hexagonal elements of the roof structure can be of monoblock construction. In this embodiment, as in the other embodiments described, elements or blocks of the roof structure can be horizontally shiftable upon the support, e.g. the suspension means can be horizontally shiftable upon the supports to allow interengagement of the complementary formations of adjacent lateral sides of the blocks.

BRIEF DESCRIPTION OF THE DRAWING

The above and other objects, features and advantages of the present invention will become more readily apparent from the following description, reference being made to the accompanying drawing in which.

SPECIFIC DESCRIPTION

Figure 1:
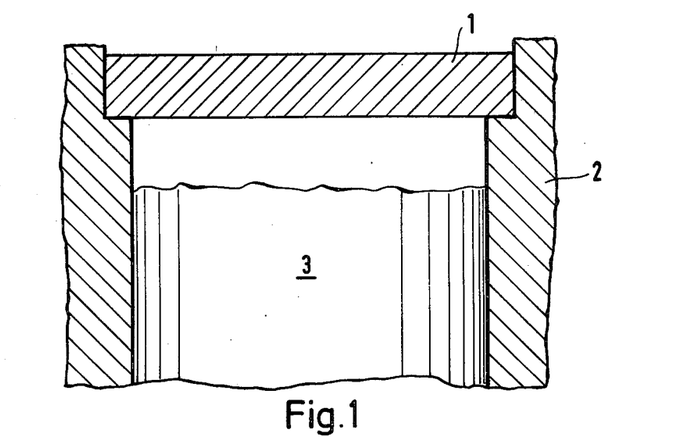
FIG. 1 is a schematic vertical longitudinal cross sectional view through the upper portion of a nuclear reactor embodying the present invention.

FIG. 1 illustrates, strictly diagrammatically, a nuclear reactor whose pebble-bed or core 3 is received in a housing 2 of graphite and constituting the lateral reflector. The reactor is provided with a top reflector 1 which is supported by a suspension as will be described below. The nuclear reactor core 3, of course, contains the fissionable fuel which brings about the chain reaction.

Figure 1A:
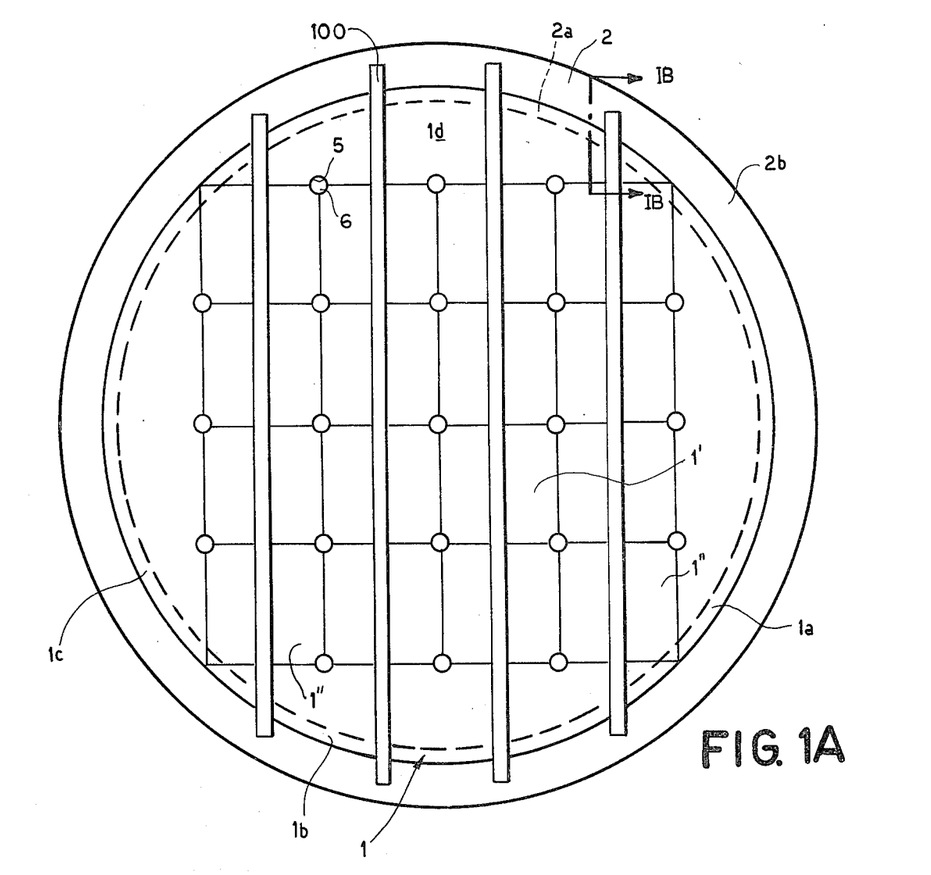
FIG. 1A is a plan view of a reactor shown in somewhat greater detail and illustrating other aspects of the top reflector.
Figure 1B:
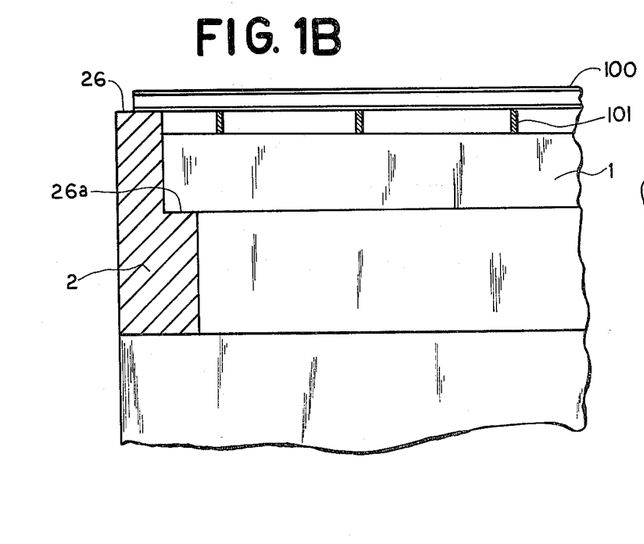
FIG. 1B is a sectional view through a portion of this structure as seen for example, along the line IB—IB of FIG. 1A.

The suspension means is shown only diagrammatically in FIG. 1A and here is seen to consist of a plurality of rails 100 (see also FIG. 1B) which rest upon the top surface 2b of the housing 2 formed with an inward step 2a upon which the cover 1 can come to rest in the event of failure of the suspension. Suspenders 101 depend from the rails 100 and carry the graphite blocks 1', 1" constituting the cover assembly.

As can be seen from FIG. 1A, moreover, the cover 1 is generally circular and is made up of segmental blocks 1a, 1b, 1c, 1d and rectangular blocks 1', 1", the blocks 1" being, for the most part, the same as the blocks 4 to be described hereinafter.

Figure 2:
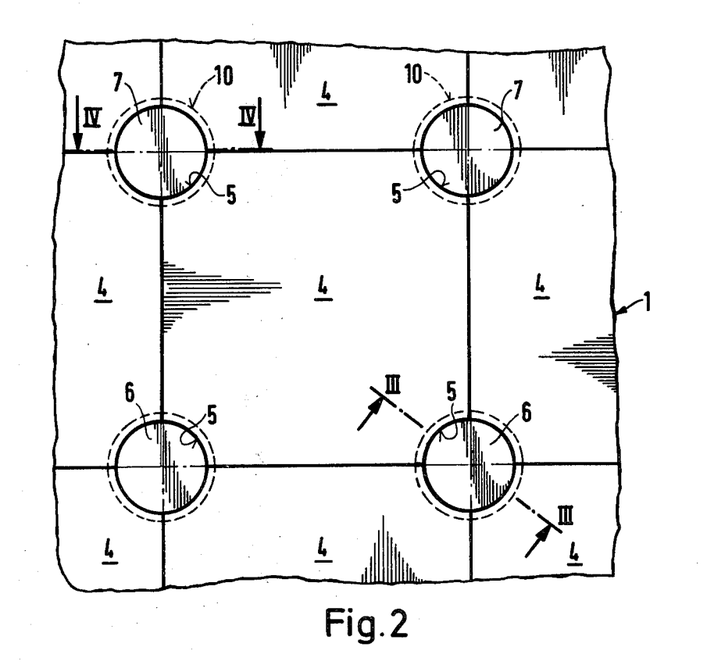
FIG. 2 is a detail view from above of an element of the cover structure of FIG. 1.

Thus, the top reflector 3 is assembled from a multiplicity of individual blocks, e.g. the block 4 shown in FIG. 2, which are suspended from elements 101 and the supports 100. Naturally, the blocks may rest directly upon rails if desired.

Figure 6:
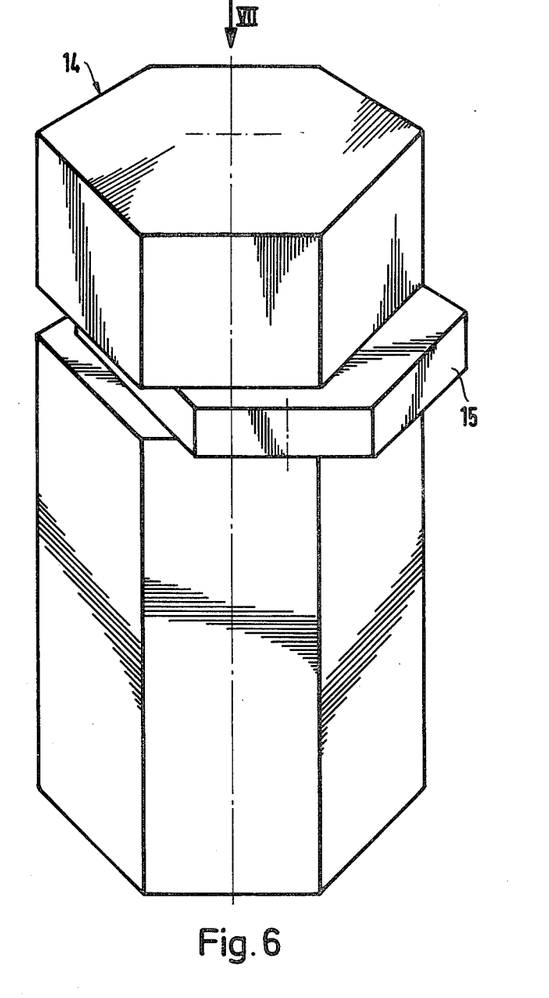
FIG. 6 is a perspective view of one of the hexagonal regular prism blocks of another embodiment of the invention.

In plan view the blocks are polygonal and are laterally contiguous with other blocks so that sealed joints are formed where the lateral faces of the blocks adjoin. The blocks may be square (FIG. 2) or hexagonal (FIG. 6) in plan view although it can cover other plan configurations as required, e.g. the configuration of an equilateral triangle. Naturally, depending upon the shape of the blocks chosen, correcting edge members such as those shown at 1a–1d will be provided to accommodate the outline of the top reflector to the outline of the housing 2 of the reactor.

According to the invention, the laterally adjacent blocks of the top reflector are form-fitting and form a junction defined between at least one projection from one block and at least one groove of an adjoining block so that the joint is constituted as a labyrinth and the mutually engaging formation can limit the segment of the cover upon failure of the suspension and, more generally, take up the shear or leading stresses perpendicular to the plane of the top.

In the best mode embodiment of the invention, illustrated in FIGS. 2 through 5, the block 4 is of square plan outline and at all four corners of each block 4 there is provided a recess 5 of cylindrical segmental configuration and all with the same radius of curvature, the axis of each cylinder segment lying substantially at the corner of the imaginary rectangle defined by the lateral faces of the block 4. The blocks 4 are so assembled into the cover that the recesses 5 of two or more blocks adjoin to form cylindrical passages.

Figure 1C:
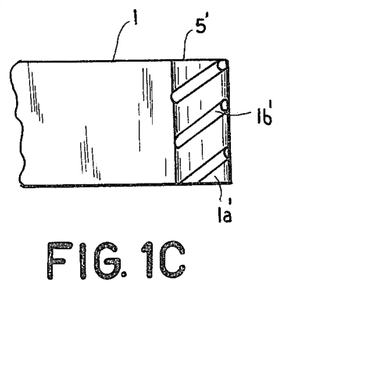
FIG. 1C is a detail view of a corner region of a block used in the assembly of the top reflector of FIGS. 1A and 1B.

As can be seen from FIG. 1C for a block 1', the corner recess 5' can be provided with inclined but parallel grooves 1b' in the face 1a', the grooves of the recesses defining each cylindrical passage registering with one another to form a multithread female screw. A male-threaded plug 6 is screwed into each passage (see FIG. 3) and provides the toothed formation holding the blocks against relative movement. This construction has been found to be particularly convenient because it enables rapid assembly or removal and replacement of the blocks individually or in groups.

Figure 1D:
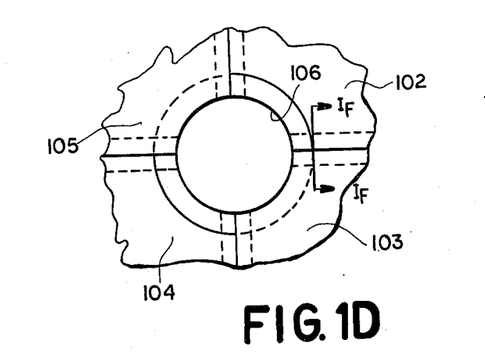
FIG. 1D is a plan view illustrating the assembly of a corner junction according to one embodiment of the invention.
Figure 1E:
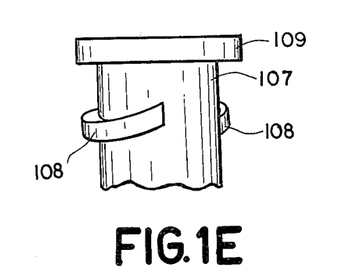
FIG. 1E is an elevational view of a plug as used in the assembly of FIG. 1D.

Some of the passages can, if desired, be provided with a more rapid connection in the form of a bayonet joint. This has been illustrated diagrammatically in FIGS. 1D–1F. In these FIGS. the four blocks 102–105 defining the passage 106 at three corners are provided with inclined grooves into which the flights 108 of the bayonet plug 107 can engage upon insertion of this plug into the passage and upon rotation of the plug through 90°. In addition, shear forces between adjacent blocks can be taken up by splines 110 which are inserted into registering grooves 102', 103' of the blocks 102, 103, and assembled, so that these splines clear the plug 107 for insertion thereof. The bayonet assembly of FIGS. 1D through 1F can be emplaced more rapidly than the screw assembly of FIG. 3.

Figure 4:
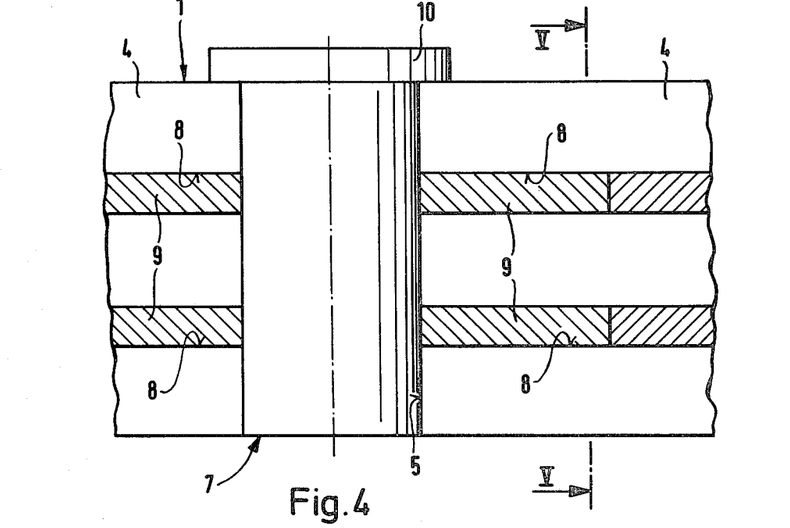
FIG. 4 is a section along the line IV—IV of FIG. 2.
Figure 5:
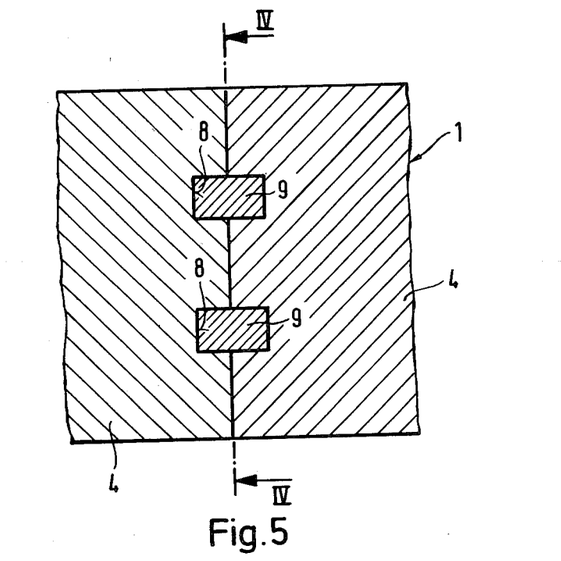
FIG. 5 is a section taken along the line V—V of FIG. 4.

The cover of FIG. 2 can be provided with a further locking arrangement as shown in FIG. 4. Here the mutually confronting lateral sides of the blocks 4 are provided with milled grooves 8 in which shear splines 9 are provided. The shear splines are inserted through the ends of the grooves where they open into the recesses 5. It has been found to be advantageous to form the splines 9 with a length of at most a diameter of the cylindrical passage 5. These passages are then closed by plugs 7 which can have flanges 10 overlying the top.

Figure 3:
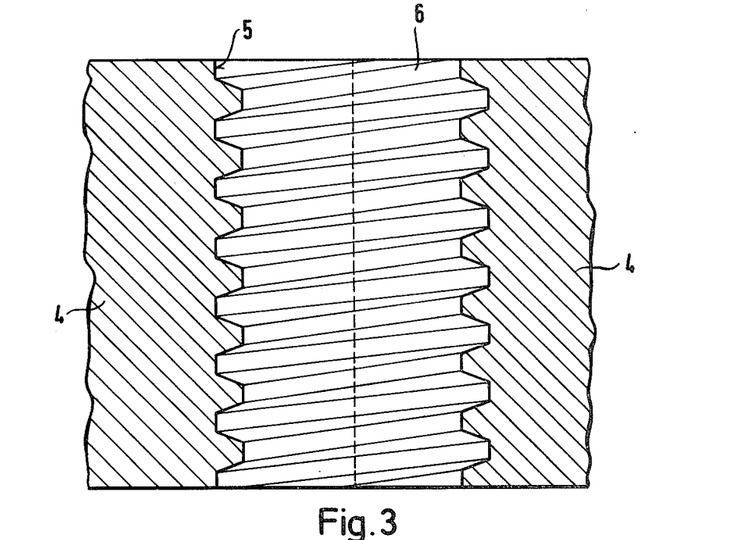
FIG. 3 is a section taken along the line III—III of FIG. 2.

The construction of FIGS. 2 through 4 enables replacement of individual reflector blocks without making it necessary to remove the neighboring blocks. However, this system requires several different structures such as the blocks 4 and the locking bodies 6, 7, 9.

When it is more desirable to assemble the top reflector from one type of structural element and it is not essential that individual blocks be removed without disturbing other blocks, the system illustrated in FIGS. 6 through 9 can be employed. In this case, the form-fitting connection of the blocks is effected by the lateral profiling of the blocks.

The blocks 14 are hexagonal regular prisms and are formed of monoblock or one-piece cast construction. A disk or portion of the prism is horizontally offset from the remainder thereof along a diagonal of the hexagon as will be apparent from FIG. 7. This causes the disk or flange to project along three sides of the hexagon and a recess to be formed on the opposite three sides.

Figure 7:
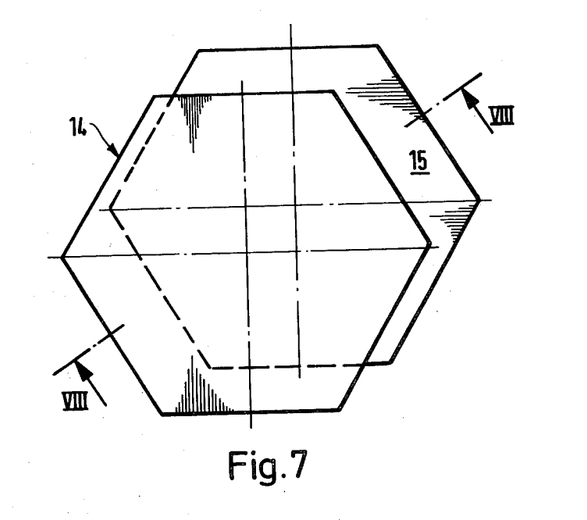
FIGS. 7 and 9 are plan views of this block.
Figure 8:
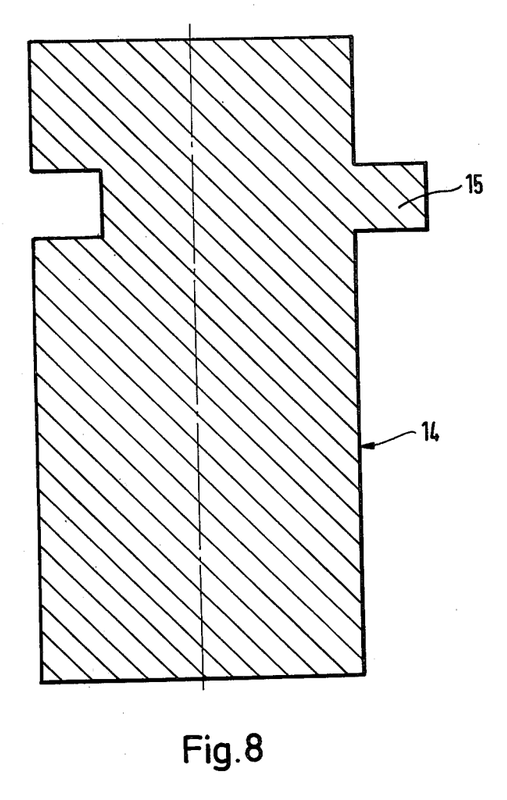
FIG. 8 is a diagram illustrating the assembly of blocks of the type shown in FIGS. 6 through 8 into a top reflector.

The projecting portion is dimensioned to fit into the corresponding recesses of adjacent prismatic bodies.

Figure 9:
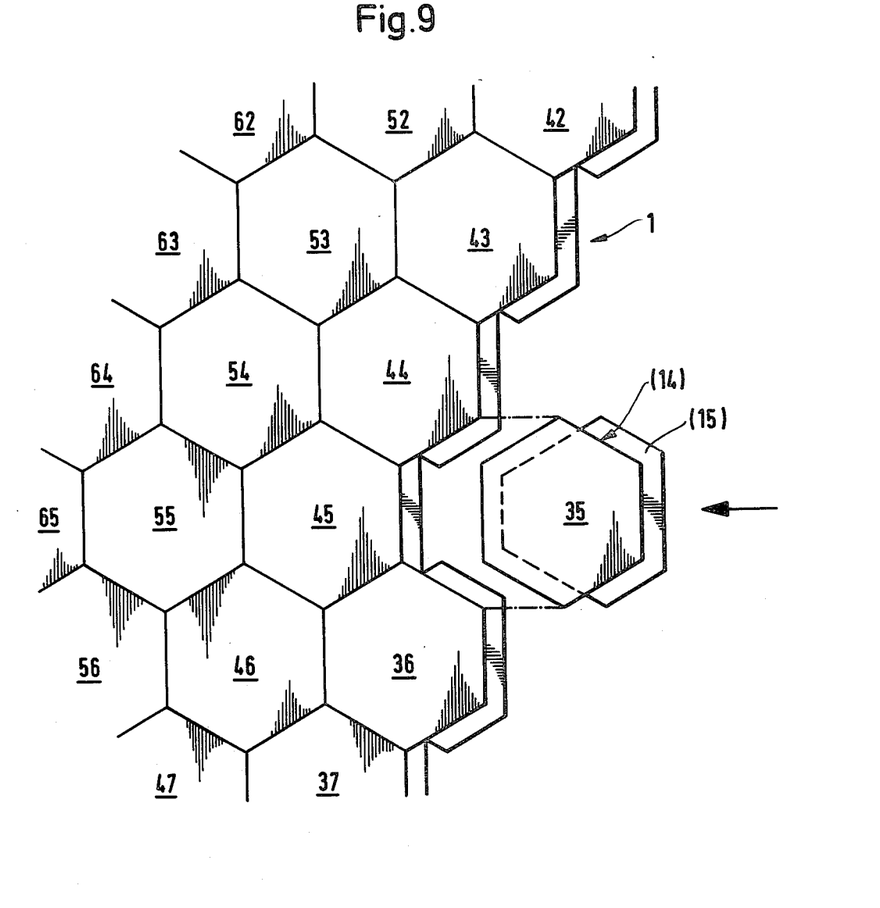

FIG. 9 shows how the top reflector is assembled from such prismatic bodies.

Initially, three of the blocks 14 are so assembled in side-by-side relation, that they define an angular groove in which the projection 15 of a fourth block can be received. The subsequent blocks are then each inserted so that three projections engage in the recesses of three previously positioned blocks.

The reference numerals 35–37, 42–47, 52–56 and 61–64 represent, in inverted order, the sequence in which the blocks are positioned. Block 35, the last of the illustrated sequence, is inserted simply in the direction of the arrow.

Figures 1F, 1G, 1H:
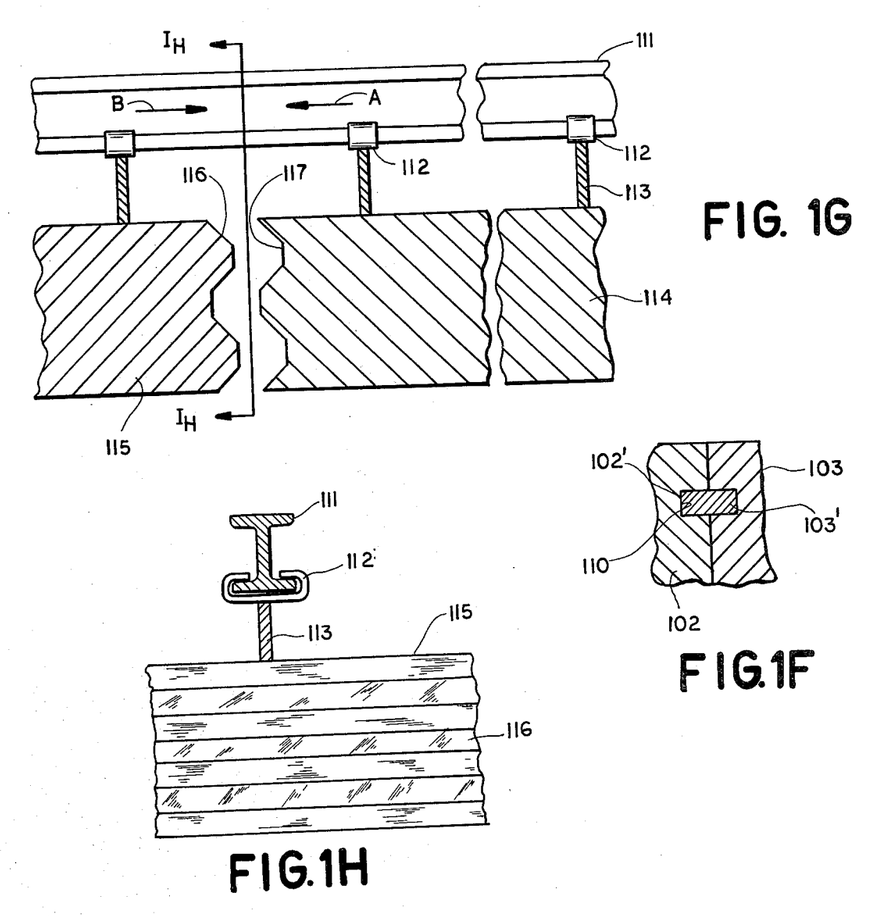
FIG. 1F is a sectional view taken along the line 1F—1F of FIG. 1B.
FIG. 1G is a diagrammatic illustration of the assembly of a top reflector according to another embodiment of the invention.
FIG. 1H is a sectional view taken along the line 1H—1H of FIG. 1G.

FIGS. 1G and 1H show that the blocks 114 and 115, which are provided with complementary toothed formations on their mutually engaging sides 116, 117, are brought together by sliding block 115 in the direction of arrow B or block 114 in the direction of arrow A. The blocks 114 and 115 are supported by suspenders 113 from brackets 112 and are horizontally shiftable on the rail 111 with the brackets to enable the lateral interfitting of the formations. A similar rail structure and sliding suspender means can be used for the embodiment of FIGS. 6 through 9.

We claim:

1. In a nuclear reactor having a housing enclosing a nuclear reactor core and a support for a planar top reflector, the improvement which comprises a top reflector assembled from blocks and form-fittingly interconnected with a toothed structure at adjoining lateral faces of adjacent blocks for retaining said blocks against collapse upon failure of said support, said blocks being prismatic and having vertical corners formed with cylindrical segmental recesses defining with corresponding recesses of other blocks cylindrical passages, and respective rotatable plugs received in said passages, the walls of said recesses being provided with grooves and said plugs having flights engaging said grooves, said support comprising rails spanning said core and means for mounting said blocks on said rails.

2. The improvement defined in claim 1 wherein said grooves and flights form a screwthread structure.

3. The improvement defined in claim 1 wherein said grooves and flights form a rapid bayonet connection.

4. The improvement defined in claim 1 wherein said blocks have confronting faces formed with registering grooves, splines extending in said grooves and supporting adjoining blocks against shear.

5. The improvement defined in claim 1 wherein adjoining lateral faces of adjacent blocks are formed with complementary toothed formations.

6. The improvement defined in claim 1 wherein said blocks are of rectangular plan outline.

7. The improvement defined in claim 1 wherein said blocks are of hexagonal regular prismatic configuration and are formed with a portion offset from the remainder along a diagonal of the hexagonal configuration whereby said portion forms a projection along three sides of the hexagon and a recess along the other three sides thereof.

8. The improvement defined in claim 7 wherein said blocks are formed unitarily with said portions.

9. The improvement defined in claim 1, further comprising means for mounting said blocks horizontally shiftably on said support.

* * * * *